(12) United States Patent
Skillermark et al.

(10) Patent No.: US 9,800,308 B2
(45) Date of Patent: Oct. 24, 2017

(54) TRANSMITTING NODE AND METHOD FOR RANK DETERMINATION

(71) Applicant: Telefonaktiebolaget LM Ericsson (publ), Stockholm (SE)

(72) Inventors: Per Skillermark, Årsta (SE); David Astely, Bromma (SE); Per Burström, Luleå (SE); Jonas Fröberg Olsson, Ljungsbro (SE); Chrysostomos Koutsimanis, Stockholm (SE); Olle Rosin, Linköping (SE); Sara Sandberg, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 209 days.

(21) Appl. No.: 14/759,880

(22) PCT Filed: Feb. 18, 2013

(86) PCT No.: PCT/SE2013/050135
§ 371 (c)(1),
(2) Date: Jul. 8, 2015

(87) PCT Pub. No.: WO2014/126517
PCT Pub. Date: Aug. 21, 2014

(65) Prior Publication Data
US 2015/0358062 A1 Dec. 10, 2015

(51) Int. Cl.
*H04B 7/04* (2017.01)
*H04L 1/18* (2006.01)
(Continued)

(52) U.S. Cl.
CPC ............ *H04B 7/0486* (2013.01); *H04B 7/04* (2013.01); *H04B 7/0482* (2013.01); *H04B 7/063* (2013.01);
(Continued)

(58) Field of Classification Search
CPC ...... H04B 7/04; H04B 7/0452; H04B 7/0456; H04B 7/0486
See application file for complete search history.

(56) References Cited

U.S. PATENT DOCUMENTS

2008/0192718 A1* 8/2008 Jongren ............... H04B 7/0617
370/342
2010/0304691 A1* 12/2010 Goransson ........... H04B 7/0417
455/69
(Continued)

FOREIGN PATENT DOCUMENTS

WO 2006138337 A1 12/2006
WO 2011112127 A1 9/2011

OTHER PUBLICATIONS

European Supplementary Search Report dated Sep. 6, 2016 for European Regional Phase Application Serial No. 13 875 282.9-1874, European Regional Phase Entry Date: Jun. 16, 2015 consisting of 4-pages.
(Continued)

Primary Examiner — Scott M Sciacca
(74) Attorney, Agent, or Firm — Christopher & Weisberg, P.A.

(57) ABSTRACT

A transmitting node and methods therein
A transmitting node and a method therein for controlling a transmission rank in a wireless communications system. The wireless communications system comprises the transmitting node and a receiving node. The transmitting node is configured to transmit on multiple antennas according to the transmission rank. The transmitting node allocates one or more first transmission resources between the transmitting node and the receiving node to operate according to a first transmission rank, and one or more second transmission resources between the transmitting node and the receiving node to operate according to a second transmission rank.
(Continued)

When a performance of the second transmission rank outperforms a performance of the first transmission rank, the transmitting node configures at least one of the one or more first transmission resources to operate according to the second transmission rank.

20 Claims, 4 Drawing Sheets

(51) Int. Cl.
*H04L 1/00* (2006.01)
*H04W 72/04* (2009.01)
*H04B 7/06* (2006.01)

(52) U.S. Cl.
CPC .......... *H04L 1/0003* (2013.01); *H04L 1/0026* (2013.01); *H04L 1/1812* (2013.01); *H04L 1/1867* (2013.01); *H04W 72/0446* (2013.01); *H04B 7/0639* (2013.01); *H04B 7/0643* (2013.01)

(56) References Cited

U.S. PATENT DOCUMENTS

| | | | | |
|---|---|---|---|---|
| 2011/0032839 | A1* | 2/2011 | Chen | H04B 7/024 370/252 |
| 2011/0085507 | A1* | 4/2011 | Jongren | H04B 7/0413 370/329 |
| 2012/0057538 | A1* | 3/2012 | Adhikari | H04L 1/0025 370/329 |
| 2012/0140706 | A1 | 6/2012 | Doppler et al. | |
| 2012/0140723 | A1* | 6/2012 | Taoka | H04B 7/0639 370/329 |
| 2012/0270535 | A1* | 10/2012 | Chen | H04W 24/10 455/422.1 |
| 2013/0033989 | A1 | 2/2013 | Barbieri et al. | |
| 2013/0094543 | A1* | 4/2013 | Zhang | H04L 5/0023 375/219 |
| 2013/0121312 | A1* | 5/2013 | Roman | H04B 7/0486 370/335 |
| 2013/0329663 | A1* | 12/2013 | Pelletier | H04W 72/0413 370/329 |
| 2015/0207608 | A1* | 7/2015 | Suikkanen | H04L 1/0003 370/329 |

OTHER PUBLICATIONS

International Search Report and Written Opinion dated Feb. 6, 2014 for International Application Serial No. PCT/SE2013/050135, International Filing Date—Feb. 18, 2013 consisting of 16-pages.
3GPP TS 36.211 V8.9.0 (Dec. 2009) 3rd Generation Partnership Project; Technical Specification Group Radio Access Network; Evolved Universal Terrestrial Radio Access (E-UTRA); Physical Channels and Modulation (Release 8) Dec. 16, 2009 consisting of 83-pages.
ETSI TS 136 423 V11.3.0 (Jan. 2013), Technical Specification, 3LTE; Evolved Universal Terrestrial Radio Access Network (E-UTRAN); X2 Application Protocol (X2AP) (3GPP TS 36.423 version 11.3.0 Release 11), Dec. 19, 2012 consisting of 143-pages.

* cited by examiner

TRANSMITTING NODE AND METHOD FOR RANK DETERMINATION

TECHNICAL FIELD

Embodiments herein relate to a transmitting node and a method therein. In particular, it relates to controlling adaptation of a transmission rank of a multi-antenna transmission between the transmitting node and a receiving node.

BACKGROUND

Communication devices such as wireless devices are also known as e.g. User Equipments (UEs), terminals, mobile terminals, wireless terminals and/or mobile stations. Wireless devices are enabled to communicate wirelessly in a cellular communications network or wireless communications network, sometimes also referred to as a cellular radio system or cellular network. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device§ or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. In the context of this disclosure, the expression Downlink (DL) is used for the transmission path from the base station to the UE. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the Global System for Mobile communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for UEs. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

Multi-antenna transmission and reception is an efficient means to improve data rates and capacity in wireless communications systems. A multi-antenna transmission has two partly separate aims: improving Signal to Interference and Noise Ratio (SINR) and sharing SINR. For example, in a cellular communications system, not only noise but also interference from other cells disturbs transmissions. The inter-cell interference is typically rather strong at the cell edge and considerably weaker closer to the cell center while the opposite is true for the received energy of the intended transmission. Consequently, improving the SINR by means of beamforming is well-suited for cell-edge UEs. On the other hand, the cell-center UE with high SINR may benefit more from sharing the SINR by means of Multiple-Input Multiple-Output (MIMO) transmission with spatial multiplexing. The number of simultaneously transmitted data streams a MIMO channel can support is commonly referred to as a channel rank and the actually transmitted number of data streams is correspondingly termed transmission rank. Thus, rank-one transmissions increase the coverage in terms of cell edge data rates whereas spatial multiplexing, i.e. rank larger than one, improves peak rates. 3GPP LTE Release-8, 3GPP TS 36.211, v8.9.0, chapter 6.3.3, permits up to four data streams, i.e. layers, to be transmitted in downlink operation. Before data in the form of modulated symbols is transmitted it is distributed onto the transmit antenna array in a process called precoding. In order to maximize the data transfer efficiency, the transmission rank should, just like other transmission parameters such as the Modulation and Coding Scheme (MCS), the channel code rate, and the precoder weights, be adapted to the channel and interference situation. To enable this adaptation, estimation of the channel and interference characteristics is required and often this estimation is performed at the receiving node, e.g. in an UE, which then reports the outcome of the estimation to the transmitting node. It is however also possible to perform the estimation at the transmitting node.

In downlink transmission in 3GPP LTE Release-8 the estimation of the channel and interference situation is performed at a receiving node, i.e. in a UE. Then the receiving node reports recommended transmission parameters to the transmitting node, e.g. a base station. Please note that it is also possible for the receiving node to be a base station and the transmitting node to be a UE. The report comprises a recommended transmission rank, also known as Rank Indicator (RI), a preferred precoder for this transmission rank, as well as an estimation of the channel quality, e.g. a Channel Quality Indicator (CQI). The CQI is calculated conditioned on the fact that the recommended rank and precoder is employed in the transmission. The transmitting node typically uses the reported information to select transmission parameters, but it has the right not to follow the recommendation and use a different set of transmission parameters. However, it is difficult for the transmitting node to determine whether the used transmission rank is the most suitable one under current conditions. Choosing an unnecessary low or high transmission rank leads to non-optimal performance of the wireless communications system.

SUMMARY

An object of embodiments herein is to provide a way of improving the performance in a wireless communications system.

According to a first aspect of embodiments herein, the object is achieved by a method in a transmitting node for controlling a transmission rank in a wireless communications system. The wireless communications system comprises the transmitting node and a receiving node. The transmitting node is configured to transmit on multiple antennas according to the transmission rank. The transmitting node allocates one or more first transmission resources between the transmitting node and the receiving node to operate according to a first transmission rank, and one or more second transmission resources between the transmitting node and the receiving node to operate according to a second transmission rank.

When a performance of the second transmission rank outperforms a performance of the first transmission rank, the transmitting node configures at least one of the one or more first transmission resources to operate according to the second transmission rank.

According to a second aspect of embodiments herein, the object is achieved by a transmitting node for controlling a transmission rank in a wireless communications system. The wireless communications system is adapted to comprise the transmitting node and a receiving node. The transmitting node is adapted to transmit on multiple antennas according to the transmission rank. The transmitting node comprises an allocating circuit adapted to allocate one or more first transmission resources between the transmitting node and the receiving node to operate according to a first transmission rank. The allocating circuit is further adapted to allocate one or more second transmission resources between the transmitting node and the receiving node to operate according to a second transmission rank. Further, the transmitting node comprises a configuring circuit adapted to configure at least one of the one or more first transmission resources to operate according to the second transmission rank, when a performance of the second transmission rank outperforms a performance of the first transmission rank.

Since the transmitting node allocates transmission resources, such as e.g. Hybrid Automatic Repeat request (HARQ) processes or specific pairs of System Frame Numbers (SFN) and SubFrame numbers (SF), which operate according to different transmission ranks the possibility to observe and evaluate the performance of different transmission ranks during ongoing data transfer is improved. Such improved observability during ongoing data transfer improves the possibility to adapt the transmission rank to changing channel and interference conditions. Further, since the transmitting node configures at least one of the one or more first transmission resources, to operate according to the second transmission rank when the performance of the second transmission rank outperforms a performance of the first transmission rank, the adaptation of the transmission rank to the changes in channel and interference situation is improved. Thereby, for example, the data transfer efficiency may be improved, which in turn improves the data rates and/or the capacity in the wireless communications system. In this way the performance in the wireless communications system is improved.

BRIEF DESCRIPTION OF THE DRAWINGS

Examples of embodiments herein are described in more detail with reference to attached drawings in which.

DETAILED DESCRIPTION

Figure 1:
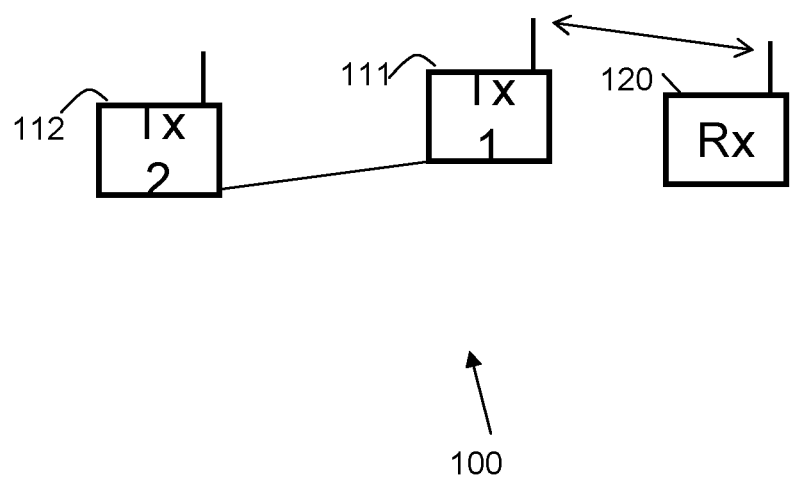
FIG. 1 is a schematic block diagram illustrating embodiments in a wireless communications system.

As part of developing embodiments herein, a problem will first be identified and discussed Even though most modern wireless communication systems provide the possibility to dynamically select the transmission rank, e.g. based on recommendations from the receiver, it is often difficult in practice to determine whether the used transmission rank is the most suitable one under the current conditions. This difficulty is caused by imperfections like e.g. biased interference estimates, measurement errors, delays, and performance differences between different types of receivers.

A parameter which defines a ratio between the data symbol power and the reference symbol power, used in the CQI calculation mentioned above, may be used to limit the effect of the interference estimation bias. In 3GPP LTE Release-8 TS 36.331, Section 6.3.2 this parameter is defined as the ratio between the Physical Downlink Shared Channel (PDSCH) power and the Cell-specific Reference Symbol (CRS) power, i.e. the nomPDSCH-RS-EPRE-Offset. In 3GPP LTE Release-11, in which additional transmission modes are available, it is possible to base the CQI calculation on the Channel State Information—Reference Signal (CSI-RS), and then the ratio between the PDSCH power and the CSI-RS power is referred to as PDSCH EPRE to CSI-RS EPRE (3GPP TS 36.213, v11.1.0, Section 7.2.5. This parameter will henceforth be referred to as the Parameter Measurement Offset (PMO) parameter. The PMO parameter may be signaled from the transmitting node to the receiving node. By setting a high PMO parameter value it is more likely that the receiving node reports a higher preferred transmission rank and hence also a precoder for this transmission rank.

However, in practice it is very difficult to use the PMO parameter in a structured way, as there are very limited means to know if the used PMO parameter value is properly selected.

In other words, in today's wireless communications systems it is difficult to know if the transmission rank is well selected.

Prior art WO2011/112127 A1 proposes to estimate the channel properties and possibly set the PMO parameter based on ACKnowledgement/Negative ACKnowledgement (ACK/NACK) of special probing packets before starting data transmission. However, no evaluation of the actual data transmission is possible. This means that changing interference conditions cannot be taken into account. Furthermore, the special probing packets require extra capacity from the communications system as compared to not sending the probing packets. Therefore an object of embodiments herein is to provide a way of improving the performance in a wireless communications system.

Embodiments herein solve the problem of evaluating actual data transmissions by allocating multiple transmission resources, such as e.g. HARQ processes or specific pairs of SFN and SF, to operate according to different transmission ranks and different values of the transmission parameters and the PMO parameter. This allows a systematic observation of how the possible choices of transmission parameters and the PMO parameter influences the performance of the data transmission. It is also a fundamental benefit that ongoing data transfers may improve by utilizing transmissions that are anyway present without needing to transmit any additional packets for probing, thus no additional capacity is needed from the communications system due to rank adaptation.

Embodiments herein are defined as a transmitting node and methods therein which may be put into practice in the embodiments described below. Further, embodiments herein are described with some reference to 3GPP LTE, but it should be noted that the embodiments may be applied also in other wireless systems, such as, e.g. WCDMA/High-Speed Packet Access (HSPA) and Worldwide Interoperability for Microwave Access (WiMax).

To improve the possibility to observe and evaluate the performance of different transmission ranks during ongoing data transfer embodiments herein propose to allocate transmission resources to different transmission ranks and evaluate the performances of transmission ranks other than the recommended transmission rank r. The transmission resources may be e.g. HARQ processes or specific pairs of SFNs and SFs. Such specific pairs of SFNs and SFs may also be referred to as System Sub-Frame Numbers (SSFN), where SSFN=10*SFN+SF. HARQ is a process of acknowledging the transmission in downlink or uplink. If the received data is error-free an acknowledgement is sent to the transmitter declaring a positive acknowledgement (ACK). If on the other hand error is detected in the transmission, a negative acknowledgement (NACK) is sent to the transmitter, which means that the packet must be re-transmitted.

In embodiments where the transmission resources are exemplified with HARQ processes the embodiments are not limited to using one or more dedicated HARQ processes operating with non-recommended transmission rank. For example, for some subframes the used HARQ process operates with recommended transmission rank, and for other subframes the used HARQ process operates with non-recommended transmission rank.

FIG. 1 depicts a wireless communications system 100 in which embodiments herein may be implemented. The wireless communications system 100 is a wireless communication network such as an LTE, WCDMA/HSPA, GSM network, any 3GPP cellular network, WiMax, or any cellular network or wireless system.

The wireless communications system 100 comprises a first transmitting node, also referred to as the transmitting node 111 and a second transmitting node 112. The wireless communications system 100 further comprises a receiving node 120. The transmitting node 111 and the receiving node 120 are adapted to transmit on multiple antennas according to a transmission rank.

In FIG. 1, the first transmitting node 111 and the second transmitting node 112 may be base stations, such as e.g. an eNB, an eNodeB, a Home Node B, a Home eNodeB or any other network node capable to serve a UE or a machine type communication device in the wireless communications system 100. In FIG. 1 the receiving node 120 may be a UE, such as a mobile terminal or a wireless terminal, a mobile phone, a computer such as e.g. a laptop, a Personal Digital Assistant (PDA) or a tablet computer, sometimes referred to as a surf plate, with wireless capability, or any other radio network unit capable to communicate over a radio link in the wireless communications system 100. However, it is also possible that the first transmitting node 111 may be a UE and the receiving node 120 may be a base station.

Figure 2:
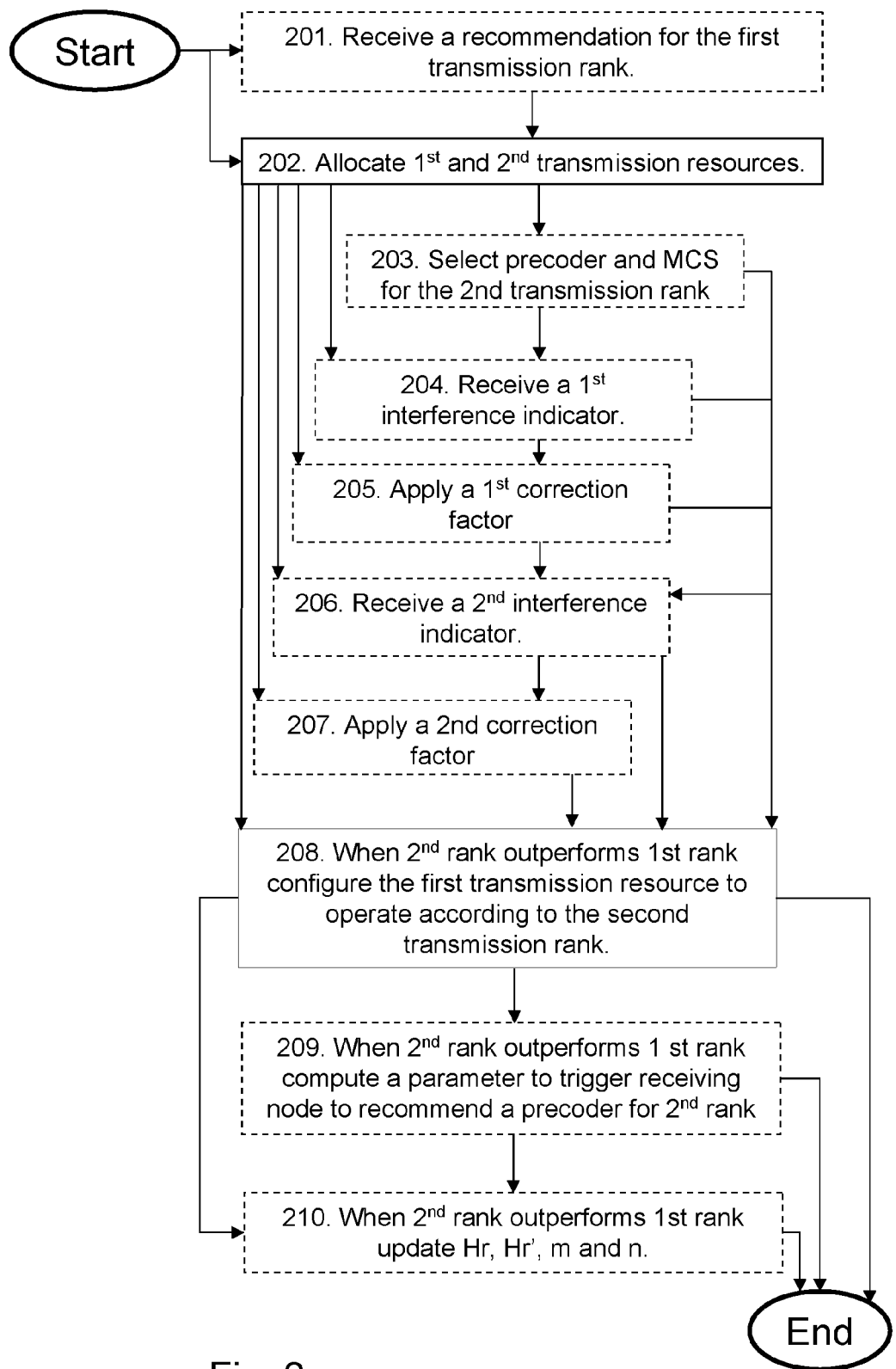
FIG. 2 is a flowchart depicting embodiments of a method in a transmitting node.

Examples of embodiments of a method in the transmitting node 111 for controlling the transmission rank in a wireless communications system 100 will now be described with reference to a flowchart depicted in FIG. 2. As mentioned above, the wireless communications system 100 comprises the first transmitting node 111, the second transmitting node 112 and the receiving node 120. The transmitting node 111 is configured to transmit on multiple antennas according to the transmission rank. The method comprises the following actions, which actions may be taken in any suitable order. Dashed lines of some boxes in FIG. 2 indicate that this action is not mandatory.

Action 201

In some embodiments the transmitting node 111 receives a recommendation for a first transmission rank, r, from the receiving node 120. The recommendation may be received in a feedback report from the receiving node 120 comprising recommended transmission parameters to the transmitting node 111. Such a feedback report may indicate that a transmission rank r is preferred under the present channel and interference situation. In the feedback report the receiving node 120 may further recommend a precoder, of rank r, to be used in the transmission, and a CQI report, conditioned on that the recommended rank and precoder are employed.

Action 202

To improve the possibility to observe how the rank adaptation influences the performance of the data transmission, the transmission performance with ranks other than the recommended rank r may regularly be evaluated. For example, multiple, N, transmission resources, such as e.g. N HARQ processes and/or N specific pairs of SFN and SF, may be available to be used for this evaluation. Therefore the transmitting node 111 allocates one or more first transmission resources, such as e.g. one or more first HARQ processes and/or one or more first specific pairs of SFNs and SFs, between the transmitting node 111 and the receiving node 120 to operate according to a first transmission rank. The first transmission rank may be recommended by the receiving node 120. The recommendation may be received in action 201. This is made in order to evaluate the performance of the first transmission rank r.

The transmitting node 111 further allocates one or more second transmission resources, such as e.g. one or more second HARQ processes or one or one or more second specific pairs of SFNs and SFs, between the transmitting node 111 and the receiving node 120 to operate according to a second transmission rank. This is made in order to evaluate the transmission performance with ranks other than the recommended rank r.

As described in more detail below the wireless communications system 100 may benefit from using more than one subframe type, such as e.g. Protected SubFrames (PSF) and non-Protected SubFrames (nonPSF).

To enable the transmitting node 111 to make different rank adaptation decisions for different subframe types the one or more first transmission resources may comprise a first set of first HARQ processes dedicated to a first subframe type, such as e.g. PSF, and/or a second set of first HARQ processes dedicated to a second subframe type, such as e.g. nonPSF. In the same manner the one or more second transmission resources may comprise a first set of second HARQ processes dedicated to a first subframe type, such as e.g. PSF, and/or a second set of second HARQ processes dedicated to a second subframe type, such as e.g. nonPSF.

In some alternative embodiments the transmitting node 111 uses a subframe pattern ranging over one or more pattern periods of first subframe type or second subframe type. The first subframe type may be PSF and the second subframe type may be nonPSF. This may be done in order to reduce overhead by not signaling the subframe pattern at the beginning of each period. In these embodiments, instead of dedicating certain HARQ processes to the first subframe type, such as e.g. PSF and dedicating other HARQ processes to the second subframe type, such as e.g. nonPSF, as mentioned above, the one or more first transmission resources may comprise a first set of subframes of the first subframe type, such as PSF, dedicated to the first transmission rank and/or a second set of subframes of the first subframe type dedicated to the second transmission rank. In the same manner the one or more second transmission resources may comprise a first set of subframes of the second subframe type, such as nonPSF, dedicated to the first transmission rank and/or a second set of subframes of the second subframe type dedicated to the second transmission rank.

When more than two transmitting antennas are used, more dedicated transmission resources for non-recommended transmission ranks may be needed for higher-order transmission ranks. Therefore in some embodiments the second transmission rank comprises multiple second transmission ranks in order to evaluate the performance of several transmission ranks. The allocation and the evaluation of the performance of the multiple transmission ranks may be done in a parallel or in a sequential manner.

In embodiments wherein multiple second transmission ranks are used a preferred transmission rank, r, may further be defined. An initial preferred transmission rank may be e.g. the recommended transmission rank, received in action 201. The multiple second transmission ranks may be chosen among transmission ranks having a value between r−m and r+n, wherein m and n are integer values, and wherein the values of m and n may be static or dependent upon which transmission rank that is defined as the preferred.

In some embodiments one of the one or more second transmission resources is dedicated to operate according to a non-preferred transmission rank. The used transmission rank for the transmission resources dedicated to operate according to the non-preferred transmission rank may further be cycled among a subset of the non-preferred transmission ranks, in order to evaluate the performance of several transmission ranks.

In some alternative embodiments, also targeting to evaluate the performance of several transmission ranks, at least one of the one or more second transmission resources is dedicated to operate according to one or more non-preferred transmission ranks. Furthermore, each of the one or more second transmission resources may use transmission ranks in different subsets of the non-preferred transmission ranks. Some subsets may be disjoint, while some sets may have one or more transmission ranks in common.

Since not all transmission ranks are likely to have the same performance the usage frequency of the multiple second transmission ranks for the one or more second transmission resources dedicated to operate according to the non-preferred transmission ranks may be different for different second transmission ranks.

Action 203

In some embodiments the transmitting node 111 selects a precoder and an MCS for the second transmission rank, since there is no recommendation for a precoder and MCS for the second transmission rank from the receiving node 120. A suitable precoder for the second transmission rank may be chosen in several different ways.

In some embodiments the selection of a precoder for the second transmission rank is based on statistics. The transmitting node 111 may collect statistics about the typical precoder transitions that occur when a new transmission rank is selected. For example, the transmitting node 111 may store a histogram of how many times each transmission rank-1 precoder is chosen given that a certain transmission rank-2 precoder was used in the previous transmissions. This action may then be performed by selecting the precoder with the highest number of precoder transitions from a precoder for the first transmission rank.

Another possibility of selecting a precoder for the second transmission rank is to consider relations between precoders of different transmission ranks. In some embodiments the selection of the precoder for the second transmission rank is performed such that the used precoders are constructed such that the precoder weights associated with the lower transmission rank is a subset of the precoder weights associated with the higher transmission rank. For example, in some embodiments, the first transmission rank is lower than the second transmission rank. In these embodiments the precoder for the second transmission rank may be selected as a linear combination of a precoder used by the first transmission rank and a at least a second precoder suitable for the first transmission rank.

In some alternative embodiments, the first transmission rank is higher than the second transmission rank. In these embodiments the precoder for the second transmission rank may be selected as the part of the precoder for the first transmission rank corresponding to a data stream with a highest quality.

The selection of the precoder for the second transmission rank may alternatively be performed by selecting different random precoders suitable for the second transmission rank.

A combination of selecting random precoders and the selection based on the recommended precoder for different transmission ranks or the collected statistics may also be considered.

In some embodiments, where downlink/uplink channel reciprocity may be assumed, for example in case of Time-Division Duplexing (TDD), the selection of the precoder for the second transmission rank is performed based on an uplink channel state estimation.

The selection of an initial MCS for the second transmission rank may be performed by selecting an MCS such that the same number of bits per resource block is transmitted with the one or more second transmission resources as for the one or more first transmission resources.

In some embodiments, the one or more second transmission resources are allocated to operate with a respective precoder and MCS. In these embodiments the selection of the precoder and the MCS for the second transmission rank may be performed by selecting any one of the respective precoders and MCSs for the second transmission rank that correspond to the one or more second transmission resources with a higher performance than the one or more first transmission resources.

Action 204

In some embodiments the transmitting node 111 receives a first interference indicator from the second transmitting node 112 to be used as input to a correction factor to the performance of the one or more first transmission resources. This is done in order to solve the problem of estimating the performance of different transmission resources with different levels of interference from the transmitting node 112, since the performance of the transmission resources also depends on the interference level from the transmitting node 112. Interference levels from the second transmitting node 112 may be quite different between consecutive transmission resources due to systematic channel variations and/or resource allocations in the second transmitting node 112. This difference may produce an additional bias in the comparison of the transmission resources when deciding on the preferred transmission rank.

Action 205

In some embodiments the transmitting node 111 applies a first correction factor to the performance of the one or more first transmission resources, based at least in part on the first interference indicator received from the transmitting node 112. The first interference indicator may be received in action 204.

Through the interference indicators described in action 204 the transmitting node 111 may be aware of the activity of the second transmitting node 112 during the transmission of a specific transmission resource and may thus apply a correction factor to the performance of the specific transmission resource.

Action 206

In order to correct the performance of the one or more second transmission resources for the interference level in the second transmitting node 112 the transmitting node 111 may receive a second interference indicator from the second transmitting node 112.

Action 207

In some embodiments the transmitting node 111 applies a second correction factor to the performance of the one or more second transmission resources, based at least in part on the second interference indicator received from the second transmitting node 112. The second interference indicator may be received in action 206.

Action 208

The transmitting node 111 may regularly monitor the performance of the different transmission resources. When a performance of the second transmission rank outperforms a performance of the first transmission rank, the transmitting node 111 configures at least one of the one or more first transmission resources to operate according to the second transmission rank. In this way the performance of the wireless communications system 100 is improved by an improved adaptation of the transmission rank to the changing transmission and interference conditions. The improved performance is achieved by improved data transfer efficiency, which in turn may improve the data rates and/or the capacity in the wireless communications system 100.

Action 209

A message may be sent from the transmitting node 111 to the receiving node 120 with instructions to change the recommended rank and precoder. E.g. in case most transmission resources operate with the second transmission rank, which is not recommended by the receiving node 120, the transmitting node 111 may compute a parameter, e.g. the PMO parameter in 3GPP LTE, to trigger the receiving node 120 to recommend a precoder for the second transmission rank, when a performance of the second transmission rank outperforms a performance of the first transmission rank. As mentioned above in action 202, the transmission resources may benefit from using more than one subframe type, such as e.g. PSF and nonPSF. The PMO parameter can be set differently per subframe for 3GPP Release-11 TS 36.331 section 6.3.2. However, for 3GPP releases before Release-11 a reconfiguration of the PMO parameter cannot be optimized for both subframe types. In this situation action 209 may be performed in such a way that the receiving node 120 is triggered to recommend a transmission rank precoder for either the first subframe type, such as e.g. PSF, or the second subframe type, such as e.g. non-PSF, or both the first subframe type and the second subframe type.

Action 210

In some embodiments when one of the non-preferred transmission ranks outperforms the transmission rank defined as the preferred, the transmitting node updates the preferred transmission rank to equal the transmission rank that outperformed the preferred transmission rank. The transmitting node also updates the subsets of the non-preferred transmission ranks.

Further Details Exemplified with LTE Downlink Operation

Embodiments herein will now be described in more detail, applicable to any suitable embodiments above. Embodiments herein are further described assuming LTE downlink operation and to begin with a special focus on the case with two transmitting antennas, i.e. the used transmission rank may be either one or two. It is however straightforward to extend the idea to other cases and a higher number of transmitting antennas, which is discussed later. Furthermore, the transmission resources are in most embodiments exemplified with HARQ processes and in some embodiments with specific pairs of SFN and SF.

Allocation of Transmission Resources

As mentioned above in action 201 the transmitting node 111 may receive a feedback report from the receiving node 120 indicating that a transmission rank r and a precoder, of transmission rank r, is preferred under current channel and interference conditions. Instead of just following the recommendations from the receiving node 120 the transmitting node 111 allocates one or more first transmission resources, e.g. one or more first HARQ processes 1, 2, . . . , N-k to operate using a preferred rank r, according to the recommendation from the receiving node, as described above in action 202. Similarly the transmitting node 111 allocates one or more second transmission resources, e.g. one or more second HARQ processes N-k+1, . . . , N-1, N to operate using the non-recommended rank r'. A simple case is described here when k=1 and where r' is defined by:

$$r' = \begin{cases} r+1, & \text{if } r = 1 \\ r-1, & \text{if } r = 2 \end{cases}$$

Figure 3:
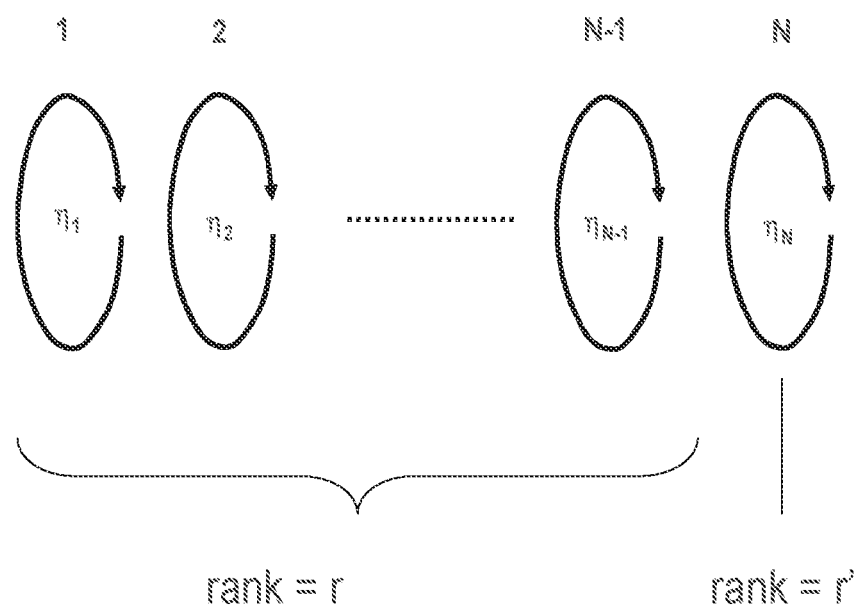
FIG. 3 is a schematic diagram of a number of different transmission resources.

As mentioned in action 208 above the performance of the different HARQ processes are continuously monitored, e.g. by estimating the link spectral efficiency, $\eta_i(t)$, for each of the N processes. The principle is illustrated in FIG. 3, which shows N-1 transmission resources dedicated to rank r, while transmission resource N is dedicated to rank r'. The cyclic arrows indicate that a comparison of the link spectral efficiency, $\eta_i$, is performed periodically.

The average link spectral efficiency, $\bar{\eta}_i(t)$, may e.g. be defined as a time filtered average of the transmission efficiency:

$$\bar{\eta}_i(t) = (1-\alpha) \cdot \bar{\eta}_i(t-1) + \alpha \cdot \eta_i(t),$$

where $$0 \le \alpha \le 1,$$

and

-continued
$$\eta_i(t) = \frac{\Gamma(t)}{N_{RB}(t) \cdot \Delta f \cdot \Delta t},$$

and $\Gamma(t)$ is the number of correctly received bits at time t, $N_{RB}(t)$ is the number of resource blocks scheduled for this transmission at time t, $\Delta f$ is the bandwidth of the resource block, and $\Delta t$ is the time duration of the transmission. In LTE, $\Delta f=180$ kHz and $\Delta t=1$ ms. In the start-up, $\overline{\eta}_i(0)$ is defined to some suitable value.

As mentioned above in action 208, when the performance of the HARQ processes operating using rank r' exceeds, e.g. with some margin, the performance of the HARQ processes using rank r, the operation of the HARQ processes are reconfigured. For example HARQ process 1 may now operate with rank r and HARQ processes 2, 3, . . . , N operate using rank r'. That is, a transmission rank reconfiguration is triggered e.g. when:

$$\frac{\overline{\eta}_N(t)}{\frac{1}{N-1}\sum_{i=1}^{N-1}\overline{\eta}_i(t)} \geq \Delta$$

where $\Delta$ takes on some suitable value larger than 1. As mentioned above in action 209, an alternative way for the transmitting node 111 to adapt the transmission rank may be to compute a parameter, e.g. the PMO parameter in LTE, which may trigger the receiving node 120 to report a precoder for the second transmission rank. In case (r, r')=(1, 2) the PMO parameter should be increased to trigger the receiving node 120 to report precoder for transmission rank r'=2. If, on the other hand, (r, r')=(2, 1) the PMO parameter value should be reduced to trigger the receiving node 120 to report precoder for transmission rank r'=1. In 3GPP LTE Release-8 TS 36.331, section 6.3.2 the PMO parameter, nomPDSCH-RS-EPRE-Offset, may take on the values [−2, 0, . . . , 12] dB.

A variant of the scheme is to first adjust the PMO parameter, to trigger the receiving node 120 to report a precoder for transmission rank r', and then in the second step reconfigure the usage of the HARQ processes.

The transmitting node 111 continues to monitor the performance of the different HARQ processes and when the performance of the HARQ processes running using transmission rank r outperforms the performance of the HARQ processes running using transmission rank r', the transmission rank reconfiguration is reversed and the PMO parameter may be re-computed to again get precoder recommendations for the more efficient transmission rank r.

Allocation of Specific Pairs of SFNs and SFs

In some embodiments, wherein the transmission resources are exemplified with specific pairs of SFN and SF, the specific pairs (SFN, SF) such that SFN*10+SF (modulo P) belongs to a set S, where P is an integer and S is a subset of $\{0, \ldots, P-1\}$, operate with the first transmission rank. Pairs (SFN, SF) such that SFN*10+SF (modulo P) does not belong to the set S operate with the second transmission rank.

Since SFN ranges from 0 to 1023 for LTE systems, P is preferable limited to 10239. With P=1, then either the first or the second transmission rank is operated for all pairs (SFN, SF) depending on if S is empty or not. Therefore for LTE systems P is preferably selected between 2 and 10239. Exemplifying with P=2 and S={0}, then the first transmission rank is operated for all the specific pairs (SFN, SF) where SF is even and the second transmission rank is operated for all the specific pairs (SFN, SF) where SF is odd.

Details on the Selection Method for a Precoder and an MCS

As mentioned above in action 203, the selection of a suitable precoder for transmission rank r', where no precoder recommendation is available, may be performed in several different ways. E.g. different transmission resources, such as e.g. different HARQ processes or different SSFNs, may be used to evaluate several precoders in parallel. Alternatively, different precoders may be evaluated in a sequential manner. If the spectral efficiency of the transmission resources, such as e.g. the HARQ processes or SSFNs, operating according to transmission rank r' is not higher than the average spectral efficiency of the transmission resources operating according to transmission rank r, another transmission rank r' precoder is selected and the process repeated.

E.g. the transmitting node 111 may select different random precoders over time, or alternatively, different random precoders in different parts of the frequency bandwidth. The performance of the second transmission rank will then be equal to the average performance obtained with the different precoders. It may be of interest to select a precoder for transmission rank r' that have a performance similar to that of the optimal precoder for transmission rank r'. As also mentioned in action 203 this may be done by considering relations between precoders of different transmission rank. For example, in LTE Release-8, i.e. in the standard specification 3GPP TS 36.211, section 6.3.4.2.3, each transmission rank-2 precoder in the codebook is a linear combination of two transmission rank-1 precoders, except for a possible rotation of the transmission rank-1 precoders:

$$\frac{1}{2}\begin{bmatrix} +1 & +1 \\ +1 & -1 \end{bmatrix}$$

is a linear combination of $$\frac{1}{\sqrt{2}}\begin{bmatrix} +1 \\ +1 \end{bmatrix} \text{ and } \frac{1}{\sqrt{2}}\begin{bmatrix} +1 \\ -1 \end{bmatrix}$$

$$\frac{1}{2}\begin{bmatrix} +1 & +1 \\ +j & -j \end{bmatrix}$$

is a linear combination of $$\frac{1}{\sqrt{2}}\begin{bmatrix} +1 \\ +j \end{bmatrix} \text{ and } \frac{1}{\sqrt{2}}\begin{bmatrix} +1 \\ -j \end{bmatrix}$$

If r=1, there is a recommended precoder for r=1. A good precoder for r'=2 may be the precoder that contains the recommended precoder for r=1 as one of its columns, since the recommended precoder suits the channel. If r=2, the receiving node 120 reports a recommended transmission rank-2 precoder which is a linear combination of two different transmission rank-1 precoders. For r=1 a suitable choice of transmission rank-1 precoder may be to consider the data stream with the highest quality, e.g. indicated by the CQI, and choose the transmission rank-1 precoder corresponding to the column of this stream.

Instead of relying on predefined relations between precoders of different transmission rank the selection of a precoder for the second transmission rank may be based on statistics, as mentioned in action 203. In the specific case described above with 4 transmission rank-1 precoders and 2 transmission rank-2 precoders, 16 different transitions (8 from transmission rank-2 to transmission rank-1 precoders and 8 from transmission rank-1 to transmission rank-2 precoders) are possible. In the proposed method, the transmission rank-r' precoder that has the highest number of transitions from the recommended transmission rank-r precoder will be selected.

Intercell Interference

As discussed above in action 204 the performance of the different transmission resources does not only depend on the MCS, precoder and transmission rank selection but it is also subjective to inter-cell interference. For example, a HARQ process with high transmission rank may perform better than another process with lower transmission rank not only because of the higher transmission rank but also because of differences in inter-cell interference. E.g. the high transmission rank HARQ process may receive less interference than the low transmission rank HARQ process. The above case will favor the transmission rank selection to the higher one, as a result of an unfair comparison.

One solution to the problem of estimating the performance of different transmission resources with different levels of inter-cell interference may be to exchange messages between base stations which disclose interference indicators. One example of such an interference indicator may be the resource allocation in the second transmitting node 112. Another example of an interference indicator may be the activity of the second transmitting node 112 during a specific HARQ process. The interference indicator may be either a new or a standardized measurement. E.g., in 3GPP LTE Release-8 TS 36.423 v8.9.0, a High Interference Indicator (HII) is introduced for proactive inter-cell interference coordination.

Through those interference indicators the transmitting node 111 may be aware of the activity of the second transmitting node 112 during the transmission of a specific HARQ process or subframe and thus apply a correction factor in the estimation of its performance. Actions 204-205 above describe how the transmitting node 111 receives a first interference indicator and applies a first correction factor, based at least in part on this first interference indicator, to the performance of the one or more first transmission resources. Actions 206-207 above describe an equivalent scenario applied to the second transmission resources.

For example, the transmitting node 111 may assume a specific amount of inter-cell interference as a baseline, e.g. full interference from the second transmitting node 112. Then if a HARQ process occur while the second transmitting node 112 is muted, the estimated performance of this HARQ process will be reduced as if there was full interference. By applying the correction, the impact of inter-cell interference variation on the selection of the preferred transmission rank and on the calculation of the PMO parameter is reduced. Hence, the performance of all transmission resources is compared by assuming similar inter-cell interference level for each one.

Support for Protected/Non-Protected Subframes

Almost Blank Subframe (ABS) is a concept targeting a heterogonous wireless communications system comprising high- and low-transmit power transmitting nodes, such as e.g. high- and low-transmit power base stations. In an example scenario the wireless communications system 100 comprises the low-power transmitting node 111 and the high-power second transmitting node 112. To allow the receiving node 120 to be served by the low-power transmitting node 111, although the signal strength from the high-power second transmitting node 112 is larger, the transmitting node 111 may exchange a subframe pattern that specifies PSFs and nonPSFs, as described above in action 202. In the PSFs the high-power transmitting node 112 is almost "muted" in the sense that it does not send any data to the receiving nodes it serves. Furthermore, the high-power transmitting node 112 does not send uplink grants in the PSFs since the Physical Downlink Control CHannnel (PDCCH) from the high-power transmitting node 112 may interfere with the PDCCH from the low-power transmitting node 111. The ABS concept is thus a method that may be used if it is desirable to offload the high-power transmitting node 112 by allowing users to be served from the low power transmitting node 111 even though they receive stronger signal from the high power transmitting node 112.

ABS is included in the 3GPP Release-10 TS 36.423 v10.5.0, where a Channel State Information (CSI) feedback (known as resource-restrictive CSI) from the receiving node 120 is with respect to the two subframe types. For 3GPP Release-8 and -9 no signaling of the ABS patterns to the receiving node 120 is available, but still ABS is possible as proprietary scheme. Especially in the case of proprietary ABS, the recommended transmission rank from the receiving node 120 may be wrong but also with support of resource-restrictive CSI the recommended transmission rank may be wrong for the reasons earlier described.

The same concept may be used for Reduced Power Subframe (RPS), which is similar to ABS except that the high-power transmitting node 112 is allowed to transmit data with reduced power in the PSF. Thus, in the PSFs the low-power transmitting node 111 may expect lower interference than in nonPSFs and adjust the transmission rank adaptation accordingly.

The CSI report and hence the transmission rank will be inaccurate in case of proprietary RPS, but will also be inaccurate with resource-restrictive CSI since the reduced interference due to reduced power may not be measured correctly. In case, the high-power transmitting node 112 and the low-power transmitting node 111 use un-shifted CRS and the receiving node 120 measures interference in resource elements for the CRS, then the receiving node 120 will likely report a too low transmission rank. Also for the case with shifted CRS, the recommended transmission rank may be wrong both in PSFs and nonPSFs due to that the receiving node 120 may be averaging the interference over several subframes.

To overcome the problems arising with ABS and RPS mentioned above the transmission resources, such as e.g. the HARQ processes or the specific pairs of SFN and SF, may be divided in two sets $H_{PSF}$ and $H_{non\text{-}PSF}$, as described above in action 202. Then the subset $H'_{PSF} \subset H_{PSF}$ may be dedicated for non-recommended transmission ranks in PSFs and the subset $H'_{non\text{-}PSF} \subset H_{non\text{-}PSF}$ may be dedicated for non-recommended transmission ranks in nonPSFs. Initially, when the transmitting node 111 does not know which transmission rank has the highest performance, the size of $H'_x$, where x is PSFs or non-PSFs, is preferably lower than the size of $H_x \backslash H'_x$. However, when $H'_x$ performs better than $H_x \backslash H'_x$ then a transmission rank reconfiguration is performed such that the size of $H'_x$ is larger than size of $H'_x \backslash H'_x$.

In some embodiments, also described in action 202, the above method is applied in the time domain. $S_{PSF}$ and $S_{non\text{-}PSF}$ are the subframe sets used in PSFs and non-PSFs.

The subframe sets for PSF and nonPSF are described by pairs of SFN and SF. Then $S'_x \subset S_x$, where x is PSFs or non-PSFs, is the subframes dedicated for non-recommended transmission rank in x.

As further described in action 202 in some other embodiments, when $H'_x$ performs better than $H_x \backslash H'_x$, the parameter, e.g. the PMO parameter, to trigger the receiving node 120 to recommend a precoder for the second transmission rank, may be recomputed. Since the PMO parameter cannot be set differently per subframe for 3GPP releases before Release-11 a reconfiguration of the PMO parameter cannot likely be optimized for both PSFs and nonPSFs, not even if resource-restrictive CSI is supported. A possible reconfiguration of the triggering parameter may either be targeting the recommended transmission rank for a specific subframe type or targeting the recommended transmission rank for both subframe types. For 3GPP Release-11, TS 36.331 section 6.3.2, and beyond, a PMO parameter is available per subframe type, per so called CSI process, that makes it possible to adjust the PMO parameter such that the recommended transmission rank equals the transmission rank with the highest performance for both subframe types.

In some embodiments one instance of the method is applied in subframes of first subframe type, such as e.g. PSF, and another instance of the method is applied in subframes of second subframe type, such as e.g. nonPSF. E.g. each instance allocates one or more first transmission resources dedicated to the first transmission rank, and one or more second transmission resources dedicated to the second transmission rank. In some embodiments, the transmission resources allocated for the first respectively the second transmission rank are the same for the two instances. In some other embodiments, the allocated transmission resources are different. Instances of the method may be preferable in particularly some embodiments when the reliability of the recommended rank depend on the subframe type, such as e.g. PSF or nonPSF.

Higher-Order Transmission Ranks

As mentioned above in action 202 more dedicated transmission resources for non-preferred transmission ranks may be needed when using higher-order transmission ranks. The preferred transmission rank mentioned in action 202 may be e.g. the recommended transmission rank. In some embodiments $H_{r-1}$ denotes the transmission resources, such as e.g. the HARQ processes or the specific pairs of SFN and SF, dedicated for non-preferred transmission rank r−1, where r is the preferred transmission rank. Similarly, $H_{r+1}$ denotes the transmission resources, such as e.g. the HARQ processes or the specific pairs of SFN and SF, dedicated for non-preferred transmission rank r+1. Clearly, $H_{r-1} \cap H_{r+1}$ is the empty set. The remaining transmission resources $H_r = H \backslash (H_{-1} \cup H_1)$, where H is the set of transmission resources, are dedicated to the preferred transmission rank. Hence, in these embodiments the used transmission ranks will be r−1, r, and r+1. When either r−1 or r+1 performs better than the preferred transmission rank a reconfiguration of the transmission rank is performed. The reconfiguration of the transmission rank may comprise a reconfiguration of the PMO parameter and/or a reconfiguration of the sizes of $H_{r+1}$ and $H_{r-1}$. For example, if r−1 is the transmission rank that has the highest performance, then the size of $H_{r-1}$ may be selected larger than $H_r$, and the size of $H_r$ may be is selected larger than the size of $H_{r+1}$.

In yet other embodiments, also mentioned in action 202, one transmission resource, e.g. one HARQ process, $I \in H$ is dedicated for non-preferred transmission ranks, where the preferred transmission rank is initially set to the recommended transmission rank, i.e. $r_{preferred} = r$. The used transmission rank for transmission resource I is cycled among a subset H' of non-preferred transmission ranks. One possible such subset is $H' = \{r_{preferred} - 1, r_{preferred} + 1\}$. Another subset is $H' = \{r_{preferred} - m, r_{preferred} - m + 1, \ldots, r_{preferred} - 1, r_{preferred} + 1, \ldots, r_{preferred} + n\}$ for integers n and m. As mentioned in action 208 the performance of transmission resource I is monitored with respect to which non-preferred transmission rank is used.

An advantage with embodiments herein is the allocation and reconfiguration of multiple transmission resources, such as e.g. multiple HARQ processes or multiple specific pairs of SFN and SF, operating according to multiple transmission ranks. This allows a systematic evaluation of the performance of the possible choices of transmission parameters, such as the transmission rank and the precoder used for the transmission rank, during ongoing data transfers. For example, in a possible 3GPP LTE Release-8 implementation the input to the rank adaptation algorithm in the receiving node 120 is the channel and interference estimates, which is estimated from the Cell specific Reference Symbols (CRSs). In time synchronized multi-cell LTE deployments, CRS transmissions in one cell are interfered by CRS transmissions in the neighboring cells, which leads to that the CRS interference estimate is typically not representative for the interference as experienced when receiving data on the Physical Downlink Shared Channel (PDSCH). The common case is that the interference is overestimated, which often leads to that an unnecessary low transmission rank is selected. Therefore it may be beneficial to make a systematic evaluation of the performance of the possible choices of the transmission parameters, such as the transmission rank, during the ongoing data transfer.

Figure 4:
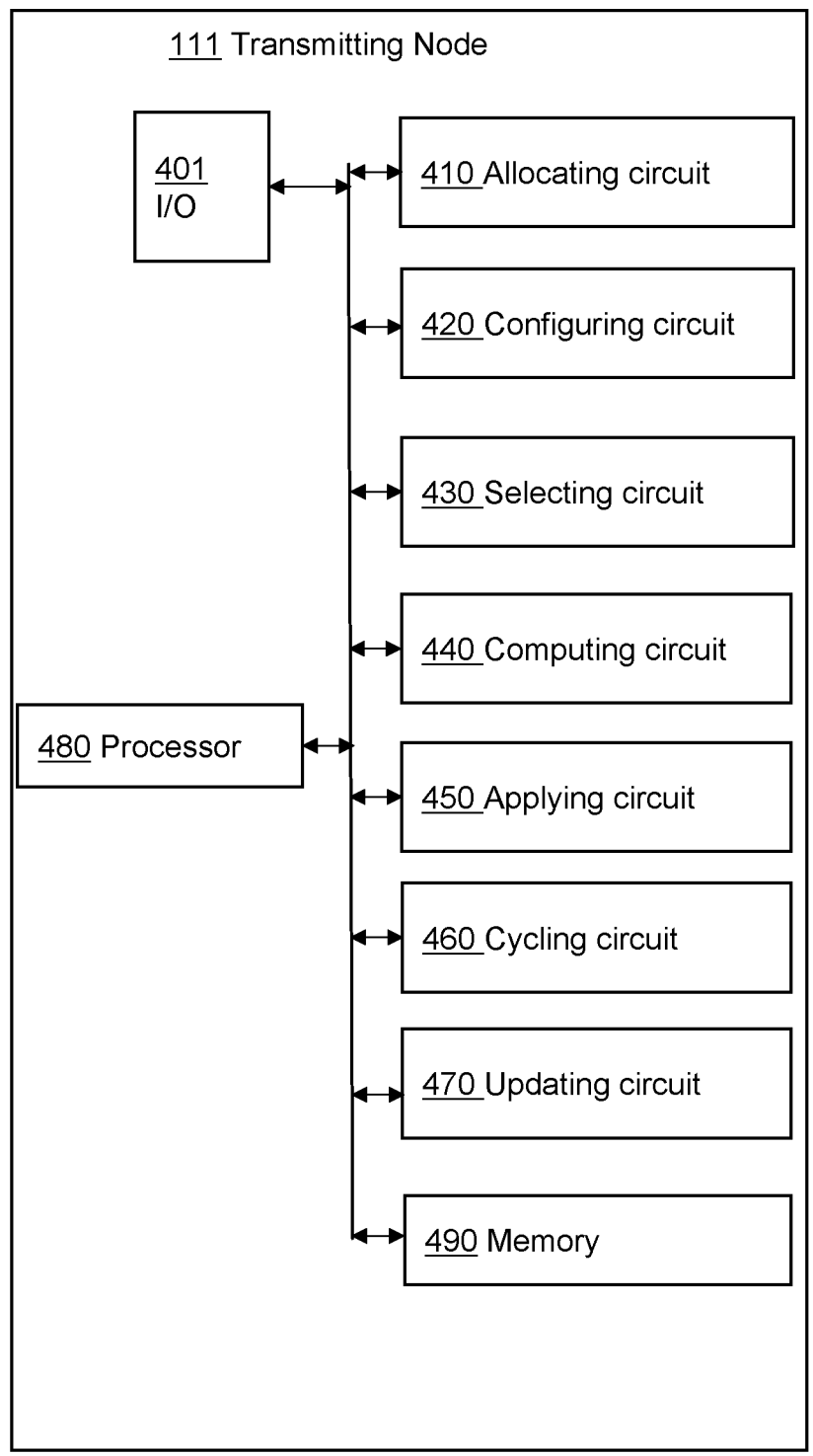
FIG. 4 is a schematic block diagram illustrating embodiments of a transmitting node.

To perform the method actions of controlling a transmission rank in a wireless communications system 100 described above in relation to FIG. 2, the transmitting node 111 comprises the following arrangement depicted in FIG. 4. As mentioned above the wireless communications system 100 comprises the transmitting node 111 and the receiving node 120. The transmitting node 111 and the receiving node 120 are adapted to transmit on multiple antennas according to the transmission rank. The wireless communications system may further comprise the second transmitting node 112.

The transmitting node 111 comprises an input and output (I/O) interface 401 configured to function as an interface for communication in the wireless communications system 100. The communication may for example be communication with the receiving node 120 or the transmitting node 112.

The transmitting node 111 comprises an allocating circuit 410 adapted to allocate one or more first transmission resources, such as e.g. one or more first HARQ processes or one or more specific pairs of SFN and SF, between the transmitting node 111 and the receiving node 120 to operate according to a first transmission rank. The allocating circuit 410 is further adapted to allocate one or more second transmission resources, such as e.g. one or more second HARQ processes or one or more second specific pairs of SFN and SF, between the transmitting node 111 and the receiving node 120 to operate according to a second transmission rank.

The first transmission rank may be recommended by the receiving node 120.

The one or more first transmission resources may comprise a first set of first HARQ processes dedicated to a first subframe type, such as e.g. PSF and/or a second set of first HARQ processes dedicated to a second subframe type, such as e.g. nonPSFs. In the same manner the one or more second transmission resources may comprise a first set of second HARQ processes dedicated to the first subframe type, such as e.g. PSFs, and/or a second set of second HARQ processes dedicated to the second subframe type, such as e.g. nonPSFs.

In some alternative embodiments the transmitting node 111 uses a subframe pattern ranging over one or more first subframe type/second subframe type pattern periods. The first subframe type may be PSF and the second subframe type may be nonPSF. Further, the one or more first transmission resources may comprise a first set of subframes of the first subframe type dedicated to the first transmission rank and/or a second set of subframes of the first subframe type dedicated to the second transmission rank. In the same manner the one or more second transmission resources may comprise a first set of subframes of the second subframe type dedicated to the first transmission rank and/or a second set of subframes of the second subframe type dedicated to the second transmission rank.

Furthermore, the second transmission rank may comprise multiple second transmission ranks.

In some embodiments a preferred transmission rank, r, is defined, and the multiple second transmission ranks are chosen among transmission ranks having a value between r−m and r+n, wherein m and n are integer values. Further, the values of m and n are static or dependent upon which transmission rank that is defined as the preferred.

In some alternative embodiments at least one of the one or more second transmission resources, such as e.g. the one or more second HARQ processes or the one or more second specific pairs of SFN and SF, are dedicated to operate according to one or more non-preferred transmission ranks. Further, each of the one or more second transmission resources use transmission ranks in different subsets of the non-preferred transmission ranks. Some of these subsets are disjoint and/or some sets have one or more transmission ranks in common.

In yet some other embodiments the usage frequency of the multiple second transmission ranks for the one or more second transmission resources dedicated to operate according to the non-preferred transmission ranks is different for different second transmission ranks.

The transmitting node 111 further comprises a configuring circuit 420 adapted to configure at least one of the one or more first transmission resources, such as the one or more first HARQ processes, to operate according to the second transmission rank, when a performance of the second transmission rank outperforms a performance of the first transmission rank.

The transmitting node 111 may further comprise a selecting circuit 430 adapted to select a precoder and an MCS for the second transmission rank.

The selecting circuit 430 may further be adapted to select the precoder for the second transmission rank by selecting the precoder with the highest number of precoder transitions from a precoder for the first transmission rank.

In some embodiments the selecting circuit 430 is adapted to select the precoder for the second transmission rank such that the used precoders are constructed such that the precoder weights associated with the lower transmission rank is a subset of the precoder weights associated with the higher transmission rank. For example, in some embodiments the first transmission rank is lower than the second transmission rank, and the selecting circuit 430 may further be adapted to select the precoder for the second transmission rank as a linear combination of a precoder used by the first transmission rank and at least a second precoder suitable for the first transmission rank.

In some alternative embodiments the first transmission rank is higher than the second transmission rank, and the selecting circuit 430 may further be adapted to select the precoder for the second transmission rank as the part of the precoder used for the first transmission rank corresponding to a data stream with a highest quality.

The selecting circuit 430 may further be adapted to select the precoder for the second transmission rank by selecting different random precoders suitable for the second transmission rank.

In some embodiments, where downlink/uplink channel reciprocity may be assumed, for example in case of Time-Division Duplexing (TDD), the selecting circuit 430 further is adapted to select the precoder for the second transmission rank based on an uplink channel state estimation.

The selecting circuit 430 may further be adapted to select an initial MCS for the second transmission rank by selecting an MCS such that the same number of bits per resource block is transmitted with the one or more second transmission resources, such as the one or more second HARQ processes, as for the one or more first transmission resources, such as one or more first HARQ processes.

Further, in some embodiments, wherein the one or more second transmission resources, such as the one or more second HARQ processes, are allocated to operate with a respective precoder and MCS, the selecting circuit 430 further is adapted to select the precoder and the MCS for the one or more second transmission ranks by selecting any one of the respective precoders and MCSs for the second transmission rank that correspond to the one or more second transmission resources with a higher performance than the one or more first transmission resources.

In some embodiments the transmitting node 111 further comprises a computing circuit 440 adapted to compute a parameter to trigger the receiving node 120 to recommend a precoder for the second transmission rank when a performance of the second transmission rank outperforms a performance of the first transmission rank.

The computing circuit 460 may further be adapted to compute the parameter to trigger the receiving node 120 to recommend a precoder for the second transmission rank in such a way that the receiving node 120 is triggered to recommend a transmission rank precoder for either the first or second type of subframes, such as e.g. the PSF or nonPSF, or both the first subframe type and the second subframe type.

In some embodiments the transmitting node 111 may further comprise an applying circuit 450 adapted to apply a first correction factor to the performance of the one or more first transmission resources, such as e.g. the one or more first HARQ processes or the one or more first specific pairs of SFN and SF, based at least in part on a first interference indicator received from a second transmitting node 112, and/or adapted to apply a second correction factor to the performance of the one or more second transmission resources, such as the one or more second HARQ processes or the one or more second specific pairs of SFN and SF, based at least in part on a second interference indicator received from the second transmitting node 112.

In some embodiments, wherein one of the one or more second transmission resources, such as one of the one or more second HARQ processes or the one or more second specific pairs of SFN and SF, is dedicated to operate according to a non-preferred transmission rank, of the multiple second transmission ranks, the transmitting node 111 may further comprise a cycling circuit 460 adapted to cycle the used transmission rank for the transmission resource dedicated to operate according to the non-preferred transmission rank among a subset of the non-preferred transmission ranks.

In some embodiments the transmitting node 111 comprises an updating circuit 470 adapted to update the preferred transmission rank to equal the transmission rank that outperformed the preferred transmission rank, and to update the subsets of the non-preferred transmission ranks when one of the non-preferred transmission ranks outperforms the transmission rank defined as the preferred.

The embodiments herein for handling transmission rank adaptation may be implemented through one or more processors, such as a processor 480 in the transmitting node 111 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the transmitting node 111. One such carrier may be in the form of a CD ROM disc. It is however feasible with other data carriers such as a memory stick. The computer program code may furthermore be provided as pure program code on a server and downloaded to the transmitting node 111.

The transmitting node 111 may further comprise a memory 490 comprising one or more memory units. The memory 490 is arranged to store information obtained from the transmitting node 112 and the receiving node 120, information about the performance of the different transmission ranks, decisions about which transmission rank, precoder and MCS to select, store data, configurations, schedulings, and applications to perform the methods herein when being executed in the transmitting node 111.

Those skilled in the art will also appreciate that the allocating circuit 410, configuring circuit 420, selecting circuit 430, computing circuit 440, applying circuit 450, cycling circuit 460, and updating circuit 470 described above may refer to a combination of analog and digital circuits, and/or one or more processors configured with software and/or firmware, e.g. stored in a memory, that when executed by the one or more processors such as the processor 480 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a transmitting node for controlling a transmission rank in a wireless communications system, which wireless communications system comprises the transmitting node and a receiving node, and which transmitting node is configured to transmit on multiple antennas according to the transmission rank, the method comprising:

allocating at least one first transmission resource between the transmitting node and the receiving node to operate according to a first transmission rank, and at least one second transmission resource between the transmitting node and the receiving node to operate according to a second transmission rank;

when a performance of the second transmission rank outperforms a performance of the first transmission rank, configuring at least one of the at least one first transmission resource to operate according to the second transmission rank; and selecting a precoder and a Modulation and Coding Scheme, MCS, for the second transmission rank, the selecting of the precoder for the second transmission rank being performed by selecting the precoder with the highest number of precoder transitions from a precoder for the first transmission rank.

2. The method of claim 1, wherein the at least one first transmission resource is at least one of (a) at least one first Hybrid Automatic Repeat reQuest, HARQ, process and (b) at least one first specific pair of System Frame Numbers, SFNs, and SubFrame numbers, SFs, and the at least one second transmission resource is at least one of (a) at least one second HARQ process and (b) at least one second specific pair of SFNs and SFs.

3. The method of claim 1, wherein the first transmission rank is recommended by the receiving node.

4. The method of claim 1, wherein selecting the precoder for the second transmission rank is performed based on an uplink channel state estimation.

5. The method of claim 1, wherein selecting an initial MCS for the second transmission rank is performed by selecting an MCS such that the same number of bits per resource block is transmitted with the at least one second transmission resource as for the at least one first transmission resource.

6. The method of claim 1, further comprising:

when a performance of the second transmission rank outperforms a performance of the first transmission rank, computing a parameter to trigger the receiving node to recommend a precoder for the second transmission rank.

7. The method of claim 1, further comprising at least one of:

applying a first correction factor to the performance of the at least one first transmission resource, based at least in part on a first interference indicator received from a second transmitting node; and applying a second correction factor to the performance of the at least one second transmission resource, based at least in part on a second interference indicator received from the second transmitting node.

8. The method of claim 1, wherein at least one of:

the at least one first transmission resource comprises:
  at least one of:
    a first set of first HARQ processes dedicated to a first subframe type; and
    a second set of first HARQ processes dedicated to a second subframe type; and the at least one second transmission resource comprises:
  at least one of:
    a first set of second HARQ processes dedicated to a first subframe type; and
    a second set of second HARQ processes dedicated to a second subframe type.

9. The method of claim 1, wherein at least one of:
the at least one first transmission resource comprises:
at least one of:
a first set of subframes of the first subframe type dedicated to the first transmission rank; and
a second set of subframes of the first subframe type dedicated to the second transmission rank; and
the at least one second transmission resource comprises:
at least one of:
a first set of subframes of the second subframe type dedicated to the first transmission rank; and
a second set of subframes of the second subframe type dedicated to the second transmission rank.

10. The method of claim 1, wherein the second transmission rank comprises multiple second transmission ranks, and wherein a preferred transmission rank is defined, and wherein at least one of the at least one second transmission resource is dedicated to operate according to at least one non-preferred transmission rank, and wherein each of the at least one second transmission resource uses transmission ranks in different subsets of the non-preferred transmission ranks, and wherein at least one of:
some sets are disjoint; and
some sets have at least one transmission rank in common, the method further comprising:
when one of the non-preferred transmission ranks outperforms the transmission rank defined as the preferred, updating the preferred transmission rank to equal the transmission rank that outperformed the preferred transmission rank, and updating the subsets of the non-preferred transmission ranks.

11. A transmitting node for controlling a transmission rank in a wireless communications system, which wireless communications system is adapted to comprise the transmitting node and a receiving node, and which transmitting node is adapted to transmit on multiple antennas according to the transmission rank, the transmitting node comprising:
an allocating circuit configured to allocate at least one first transmission resource between the transmitting node and the receiving node to operate according to a first transmission rank, and at least one second transmission resource between the transmitting node and the receiving node to operate according to a second transmission rank; and
a configuring circuit configured to configure at least one of the at least one first transmission resource to operate according to the second transmission rank, when a performance of the second transmission rank outperforms a performance of the first transmission rank; and
a selecting circuit configured to select a precoder and a Modulation and Coding Scheme, MCS, for the second transmission rank, the selecting circuit being further configured to select the precoder for the second transmission rank by selecting the precoder with the highest number of precoder transitions from a precoder for the first transmission rank.

12. The transmitting node of claim 11, wherein the at least one first transmission resource is at least one of (a) at least one first Hybrid Automatic Repeat reQuest, HARQ, process and (b) at least one first specific pair of System Frame Numbers, SFNs, and SubFrame numbers, SFs, and the at least one second transmission resource is at least one of (a) at least one second HARQ process and (b) at least one second specific pair of SFNs and SFs.

13. The transmitting node of claim 11, wherein the first transmission rank is recommended by the receiving node.

14. The transmitting node of claim 11, wherein the selecting circuit is further configured to select the precoder for the second transmission rank based on an uplink channel state estimation.

15. The transmitting node of claim 11, wherein the selecting circuit is further configured to select an initial MCS for the second transmission rank by selecting an MCS such that the same number of bits per resource block is transmitted with the at least one second transmission resource as for the at least one first transmission resource.

16. The transmitting node of claim 11, further comprising:
a computing circuit configured to compute a parameter to trigger the receiving node to recommend a precoder for the second transmission rank when a performance of the second transmission rank outperforms a performance of the first transmission rank.

17. The transmitting node of claim 11, further comprising an applying circuit configured to at least one of:
apply a first correction factor to the performance of the at least one first transmission resource, based at least in part on a first interference indicator received from a second transmitting node; and
apply a second correction factor to the performance of the at least one second transmission resource, based at least in part on a second interference indicator received from the second transmitting node.

18. The transmitting node of claim 11, wherein at least one of:
the at least one first transmission resource comprises:
at least one of:
a first set of first HARQ processes dedicated to a first subframe type; and
a second set of first HARQ processes dedicated to a second subframe type; and
the at least one second transmission resource comprises:
at least one of:
a first set of second HARQ processes dedicated to a first subframe type; and
a second set of second HARQ processes dedicated to a second subframe type.

19. The transmitting node of claim 11, wherein at least one of:
the at least one first transmission resource comprises:
at least one of:
a first set of subframes of the first subframe type dedicated to the first transmission rank; and
a second set of subframes of the first subframe type dedicated to the second transmission rank; and
the at least one second transmission resource comprises:
at least one of:
a first set of subframes of the second subframe type dedicated to the first transmission rank; and
a second set of subframes of the second subframe type dedicated to the second transmission rank.

20. The transmitting node of claim 11, wherein the second transmission rank comprises multiple second transmission ranks, and wherein a preferred transmission rank is defined, and wherein at least one of the at least one second transmission resource is dedicated to operate according to at least one non-preferred transmission rank, and wherein each of the at least one second transmission resource uses transmission ranks in different subsets of the non-preferred transmission ranks, and wherein at least one of:
some sets are disjoint; and
some sets have at least one transmission rank in common, the transmitting node further comprising:

an updating circuit configured to update the preferred transmission rank to equal the transmission rank that outperformed the preferred transmission rank, and to update the subsets of the non-preferred transmission ranks when one of the non-preferred transmission ranks outperforms the transmission rank defined as the preferred.

\* \* \* \* \*